(12) United States Patent
Laffey et al.

(10) Patent No.: US 12,124,253 B2
(45) Date of Patent: Oct. 22, 2024

(54) FILTER RESTRICTION INDICATOR

(71) Applicant: Donaldson Company, Inc., Minneapolis, MN (US)

(72) Inventors: Isaac Laffey, Waterloo, IA (US); Danny W. Miller, Ackley, IA (US); Eric Ward, Janesville, IA (US); Michael Lockert, Cedar Falls, IA (US); David Gutman, Brussels (BE); Mathijs Verstraete, Tienen (BE); Johnny Craessaerts, Sint-Agatha-Rode (BE)

(73) Assignee: Donaldson Company, Inc., Bloomington, MN (US)

( * ) Notice: Subject to any disclaimer, the term of this patent is extended or adjusted under 35 U.S.C. 154(b) by 325 days.

(21) Appl. No.: 17/438,834

(22) PCT Filed: Mar. 13, 2020

(86) PCT No.: PCT/US2020/022727
§ 371 (c)(1),
(2) Date: Sep. 13, 2021

(87) PCT Pub. No.: WO2020/190756
PCT Pub. Date: Sep. 24, 2020

(65) Prior Publication Data
US 2022/0155774 A1    May 19, 2022

Related U.S. Application Data

(60) Provisional application No. 62/819,324, filed on Mar. 15, 2019.

(51) Int. Cl.
*G05B 23/02* (2006.01)
*G01D 11/24* (2006.01)
(Continued)

(52) U.S. Cl.
CPC ....... *G05B 23/0283* (2013.01); *G01D 11/245* (2013.01); *G01L 19/086* (2013.01); *G01L 19/12* (2013.01)

(58) Field of Classification Search
CPC .. G01D 11/245; G05B 23/0283; G01L 19/12; G01L 19/143; G01L 19/086;
(Continued)

(56) References Cited

U.S. PATENT DOCUMENTS 4,369,728 A * 1/1983 Nelson ................... F02M 35/09
96/417
4,445,456 A * 5/1984 Nelson ................... B01D 46/54
96/417
(Continued)

FOREIGN PATENT DOCUMENTS

EP    1846653    10/2007
EP    2465712    6/2012
(Continued)

OTHER PUBLICATIONS

"First Office Action," for Chinese Patent Application No. 202080020998.5 mailed Aug. 18, 2023 (7 pages).
"International Preliminary Report on Patentability," for PCT Application No. PCT/US2020/022727 mailed Sep. 30, 2021 (11 pages).
"International Search Report and Written Opinion," for PCT Application No. PCT/US2020/022727 mailed Aug. 14, 2020 (18 pages).
(Continued)

*Primary Examiner* — John H Le
(74) *Attorney, Agent, or Firm* — Pauly, DeVries Smith & Deffner LLC

(57) ABSTRACT

Embodiments herein relate to filter restriction indicator (100) for a filtration system. In an embodiment, a filter restriction indicator (100) can have an electronics control cartridge (800) including an internal spacer frame (304), a first circuit board (346), a second circuit board (302) disposed over the first circuit board (346), and a pressure sensor (336) in electrical communication with the first circuit board (346). A filter fluid tube (318) defines a filter fluid channel
(Continued)

(348) in fluid communication with the pressure sensor (336). The internal spacer frame (304) can secure the first circuit board (346) at a fixed distance from the second circuit board (302). A lower housing (108) defines an ambient pressure port (310). A cap (102) defines an interior volume (332) into which the electronics control cartridge fits (800). The cap (102) can define a shielding panel (112) configured to fit over an exterior portion of the ambient pressure port (336) when the cap (102) is engaged with the lower housing (108). Other embodiments are also included herein.

18 Claims, 15 Drawing Sheets

(51) Int. Cl.
*G01L 19/08* (2006.01)
*G01L 19/12* (2006.01)

(58) Field of Classification Search
CPC .............. F02M 35/09; F02M 35/0202; F02M 35/0205; F02M 35/1038; B01D 46/0086; B01D 46/429; B01D 2279/60
USPC .......................................................... 702/34
See application file for complete search history.

(56) References Cited

U.S. PATENT DOCUMENTS

| | | |
|---|---|---|
| 5,774,056 A | 6/1998 | Berry et al. |
| 9,322,678 B1 | 4/2016 | Stawitzky et al. |
| 2017/0173505 A1 | 6/2017 | Dhingra et al. |
| 2017/0250633 A1 | 8/2017 | Moiraghi et al. |

FOREIGN PATENT DOCUMENTS

| | | |
|---|---|---|
| EP | 3421962 | 1/2019 |
| JP | S5637018 | 4/1981 |
| WO | 2006081564 | 8/2006 |
| WO | 2019053138 | 3/2019 |
| WO | 2020190756 | 9/2020 |

OTHER PUBLICATIONS

"Invitation to Pay Additional Fees," for PCT Application No. PCT/US2020/022727 mailed Jun. 24, 2020 (12 pages).

"Second Office Action," for Chinese Patent Application No. 202080020998.5 mailed Feb. 3, 2024 with English translation (9 pages).

"Third Office Action," for Chinese Patent Application No. 202080020998.5 mailed Jun. 15, 2024 (7 pages) with English translation.

* cited by examiner

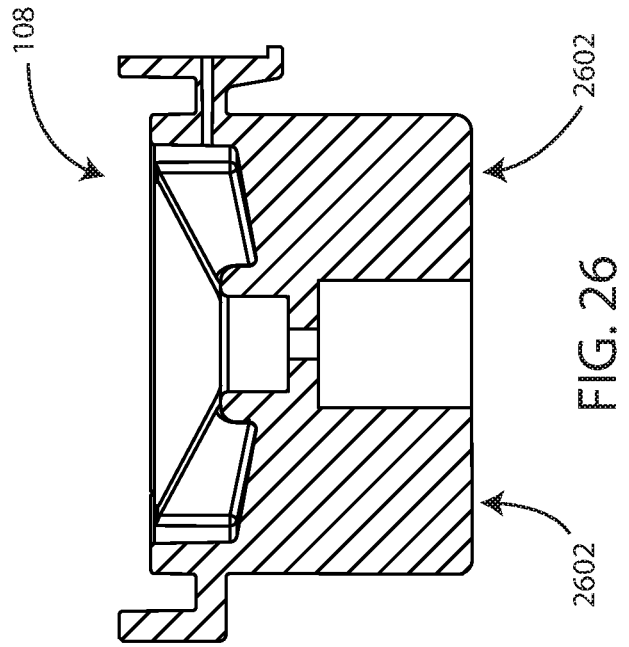

FILTER RESTRICTION INDICATOR

This application is being filed as a PCT International Patent application on Mar. 13, 2020, in the name of Donaldson Company, Inc., a U.S. national corporation, applicant for the designation of all countries, and Isaac Laffey, a citizen of the U.S., Danny W. Miller, a citizen of the U.S., Eric Ward, a citizen of the U.S., Michael Lockert, a citizen of the U.S., David Gutman, a citizen of Belgium, Mathijs Verstraete, a citizen of Belgium, and Johnny Craessaerts, a citizen of Belgium, inventors for all countries, and claims priority to U.S. Provisional Patent Application No. 62/819,324, filed Mar. 15, 2019, the contents of which are herein incorporated by reference in its entirety.

FIELD

Embodiments herein relate to filter restriction indicators for filtration systems.

BACKGROUND

Filter restriction gauges are used in connection with air filters for internal combustion engines. These devices typically sense the level of airflow restriction and provide an indication of this restriction level by providing some type of display. When the air filter has become so loaded with contaminants that the supply of air required by the engine for its operating efficiency is not being drawn through the filter, the gauge will indicate this and thus alert the operator that the filter requires cleaning or replacement. Some existing devices will also lock themselves in various positions to provide a continuous indication as to how much useful life remains in the air filter before it should be cleaned or changed.

SUMMARY

Embodiments herein relate to filter restriction indicators for filtration systems. In an embodiment, a filter restriction indicator for a filtration system is included having an electronics control cartridge that can include an internal spacer frame, a first circuit board, a second circuit board disposed over the first circuit board, and a pressure sensor in electrical communication with the first circuit board. A filter fluid tube can be disposed below the first circuit board, the filter fluid tube defining a filter fluid channel. The filter fluid channel can be in fluid communication with the pressure sensor. The internal spacer frame can be configured to secure the first circuit board at a fixed distance from the second circuit board with a gap disposed between the first and second circuit boards. A lower housing can be included defining an ambient pressure port and a cap can define an interior volume. The electronics control cartridge can be configured to fit within the interior volume of the cap. The cap can be configured to engage the lower housing, the cap can define a shielding panel configured to fit over an exterior portion of the ambient pressure port when the cap is engaged with the lower housing.

In an embodiment, the filter restriction indicator can further include a breather filter disposed over an exterior portion of the ambient pressure port.

In an embodiment, the internal spacer frame can include a lateral perimeter strut, wherein an electrically conductive cable passes over an outside surface of the lateral perimeter strut, the electrically conductive cable providing electrical communication between components of the first circuit board and components of the second circuit board.

In an embodiment, the internal spacer frame can include an upper snap fit channel to receive the second circuit board and a lower snap fit channel to receive the first circuit board.

In an embodiment, the upper and lower snap fit channels can be formed by opposed offset jaws.

In an embodiment, the upper snap fit channel can be oriented for insertion of the second circuit board from the top of the upper snap fit channel and the lower snap fit channel is oriented for insertion of the first circuit board from the bottom of the lower snap fit channel.

In an embodiment, the cap can include a lower perimeter rim, the lower rim defining a flexural relief indent.

In an embodiment, the cap can include a lower perimeter rim divided into an outer perimeter rim and an inner perimeter rim, the lower perimeter rim defining an annular relief channel disposed between the outer perimeter rim and the inner perimeter rim.

In an embodiment, the lower housing can define an outer circumferential rim, wherein the circumferential rim fits into the annular relief channel of the cap when the cap engages the lower housing.

In an embodiment, the lower housing can further define an inner circumferential rim, the inner circumferential rim separated from the outer circumferential rim by an annular seal channel.

In an embodiment, the filter restriction indicator can further include a compression gasket disposed within the annular seal channel, wherein the compression gasket is compressed when the cap engages the lower housing.

In an embodiment, the internal spacer frame can include a plurality of spacing ridges on an outside perimeter surface thereof, the spacing ridges configured to interface with an inside surface of the cap when the electronics control cartridge is positioned within the interior volume of the cap.

In an embodiment, the pressure sensor can include a first surface in fluid communication with the filter fluid channel and a second surface in fluid communication with the ambient pressure port.

In an embodiment, the lower housing can further define a central recess configured to receive the filter fluid tube.

In an embodiment, the filter restriction indicator can further include a deformable seal disposed around a lower portion of the filter fluid tube, wherein the deformable seal provides a seal between an outer diameter of the filter fluid tube and an inner diameter of the central recess of the lower housing.

In an embodiment, the deformable seal can include a plurality of annular ridges disposed on an outside surface thereof.

In an embodiment, a filter restriction indicator for a filtration system is included having an internal spacer frame, a first circuit board, a second circuit board disposed over the first circuit board, and a pressure sensor in electrical communication with the first circuit board. A filter fluid channel can be in fluid communication with the pressure sensor, wherein the first circuit board is secured at a fixed distance from the second circuit board with a gap disposed between the first and second circuit boards, a lower housing, a cap defining an interior volume. The electronics control cartridge can be configured to fit within the interior volume of the cap. The cap can be configured to engage the lower housing, the lower housing defining stabilization surfaces extending outward from a central portion of a lower surface of the lower housing. The stabilization surfaces can be configured to interface with a surface of the filtration system to support the filter restriction indicator when it is mounted on the filtration system.

In an embodiment, a method of making a filter restriction indicator for a filtration system is included, the method can include assembling an electronics control cartridge including inserting a first circuit board into a bottom portion of an internal spacer frame, inserting a second circuit board into a top portion of an internal spacer frame, placing the electronics control cartridge over a lower housing, and placing a cap over the electronics control cartridge and fastening it to the lower housing.

In an embodiment, inserting a first circuit board into a bottom portion of an internal spacer frame includes snapping the first circuit board upward into a lower snap fit channel, the lower snap fit channel defined by opposed jaws.

In an embodiment, inserting a second circuit board into a top portion of an internal spacer frame includes snapping the second circuit board downward into an upper snap fit channel, the upper snap fit channel defined by opposed jaws.

In an embodiment, a method of using a filter restriction indicator for a filtration system is included, the method including mounting the filter restriction indicator over a restriction indicator port on the filtration system, measuring a pressure differential between an ambient pressure and a pressure associated with a portion of the filtration system in fluid communication with the restriction indicator port, and sending a wireless signal with the filter restriction indicator directly or indirectly reflecting the measured pressure differential. The filter restriction indicator can include an electronics control cartridge can include an internal spacer frame, a first circuit board, a second circuit board disposed over the first circuit board, and a pressure sensor in electrical communication with the first circuit board, and a filter fluid tube disposed below the first circuit board. The filter fluid tube can define a filter fluid channel, wherein the filter fluid channel is in fluid communication with the pressure sensor. The internal spacer frame can be configured to secure the first circuit board at a fixed distance from the second circuit board with a gap disposed between the first and second circuit boards. A lower housing can define an ambient pressure port. A cap can define an interior volume, wherein the electronics control cartridge is configured to fit within the interior volume of the cap. The cap can be configured to engage the lower housing, the cap defining a shielding panel configured to fit over an exterior portion of the ambient pressure port when the cap is engaged with the lower housing.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 26 is a sectional view of a lower housing in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Embodiments herein relate to filter restriction indicators for filtration systems (including, but not limited to, air filtration systems, liquid filtration systems, and the like) including features to enhance performance as well as features to enhance manufacturability.

Figure 1:
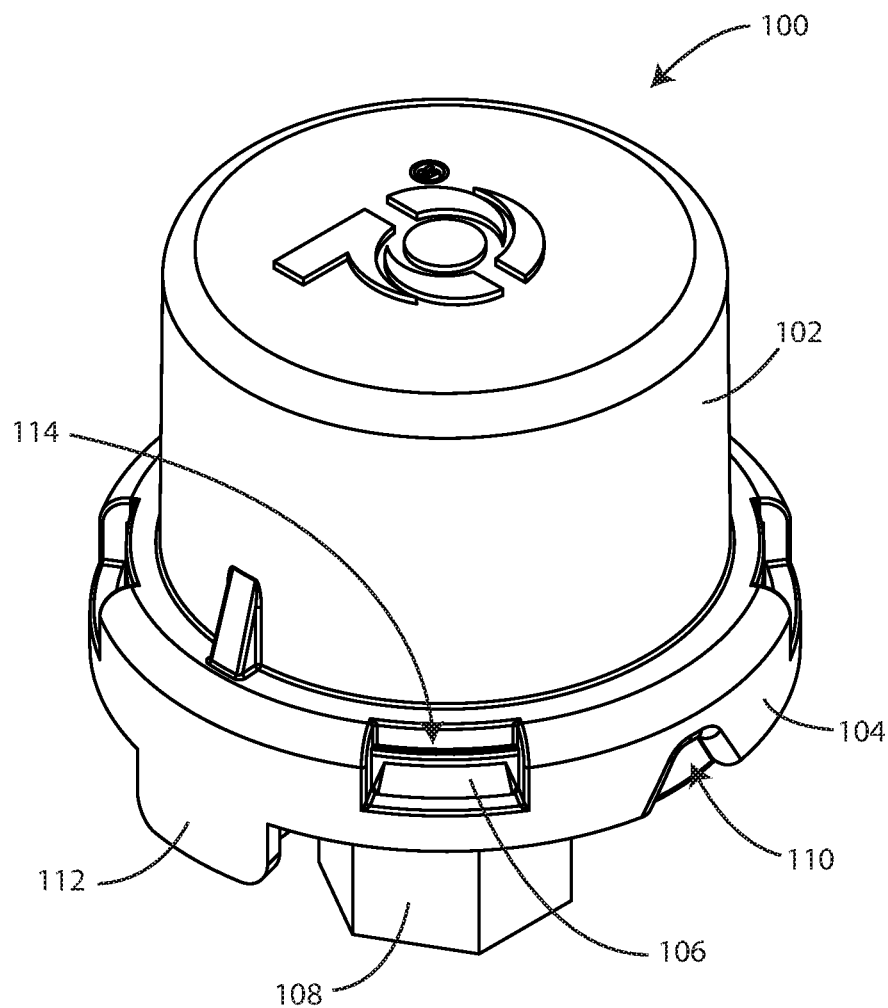
FIG. 1 is a perspective view of a filter restriction indicator in accordance with various embodiments herein.

Referring now to FIG. 1, a perspective view is shown of a filter restriction indicator 100 in accordance with various embodiments herein. The filter restriction indicator 100 includes a cap 102 defining an interior volume and a lower housing 108. The cap 102 is configured to engage the lower housing 108. The cap 102 defines a shielding panel 112 configured to fit over an exterior portion of an ambient pressure port (not shown in this view) when the cap 102 is engaged with the lower housing 108.

The cap 102 can be fastened to the lower housing 108 in various ways. In some embodiments, the cap 102 can be fastened to the lower housing 108 using a mechanical fastener. In some embodiments, the cap 102 can be fastened to the lower housing 108 using an adhesive or other composition. In some embodiments, the cap 102 can be fastened to the lower housing 108 using a snap-fit type mechanism. In some embodiments, the cap 102 can define one or more receiving windows 114 into which a tongue 106 can fit. The tongue 106 can include a lip which engages a surface of the receiving window 114 to keep it in place after it has been fully inserted into the receiving window 114. The use of a snap-fit mechanism (or other locking mechanism) can be advantageous because it resists movement or separation despite exposure to an environment with substantial vibration.

Figure 2:
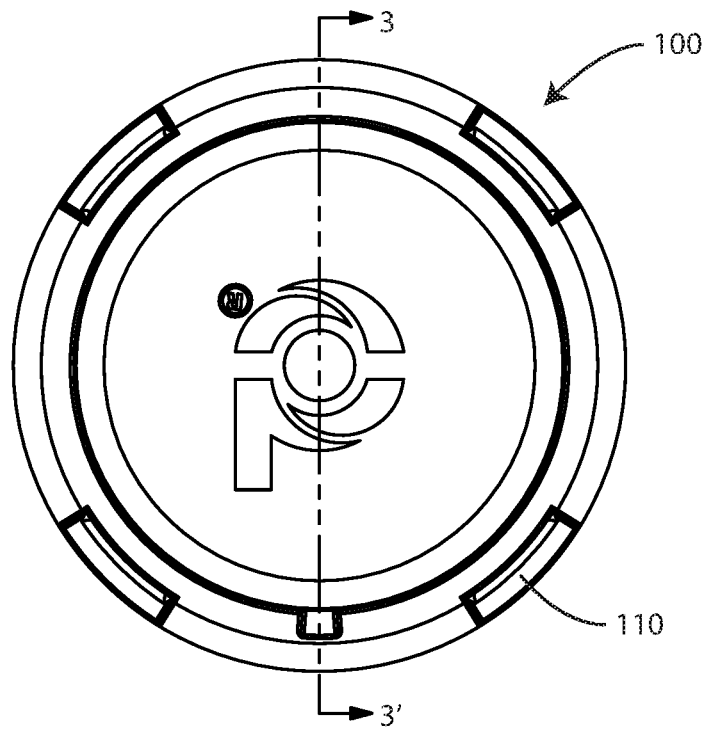
FIG. 2 is a top plan view of a filter restriction indicator in accordance with various embodiments herein.

The cap 102 can include a lower perimeter rim 104. The lower perimeter rim 104 can define one or more flexural relief indent 110. The flexural relief indent(s) 110 can allow the bottom portion of the lower perimeter rim 104 to flex outwardly more easily than if a flexural relief indent 110 was not included. FIG. 2 shows a top plan view the filter restriction indicator 100 in accordance with various embodiments herein.

Figure 3:
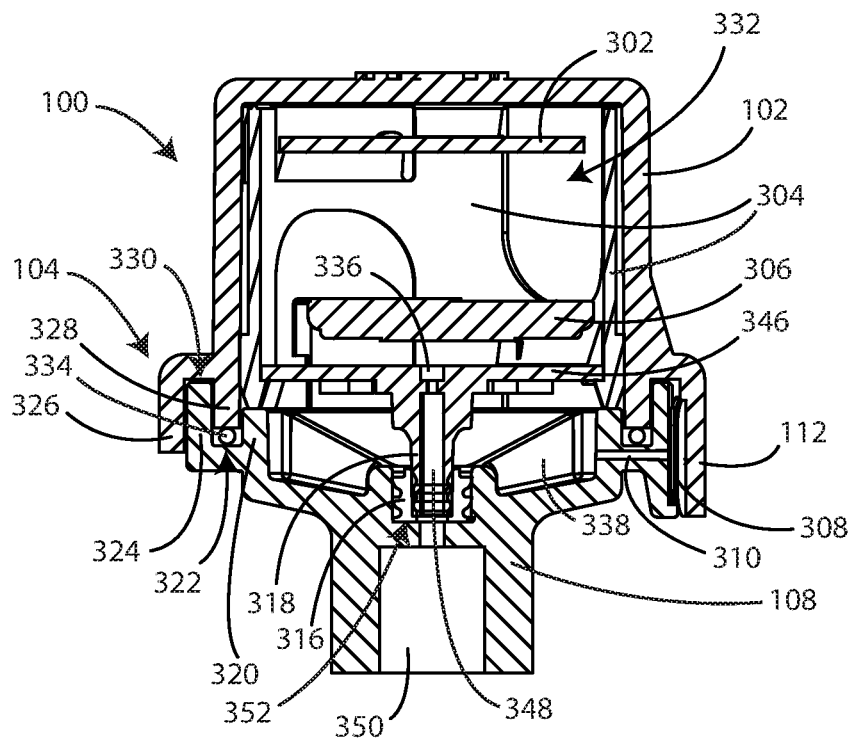
FIG. 3 is a sectional view of a filter restriction indicator as taken along line 3-3' of FIG. 2 in accordance with various embodiments herein.

Referring now to FIG. 3, a sectional view is shown of a filter restriction indicator 100 as taken along line 3-3' in accordance with various embodiments herein. The cap 102 of the filter restriction indicator 100 defines an interior volume 332. The cap 102 is configured to engage the lower housing 108.

The cap 102 can include a lower perimeter rim 104. The lower perimeter rim 104 can be divided into an outer perimeter rim 326 and an inner perimeter rim 328. The lower perimeter rim 104 can define an annular relief channel 330 disposed between the outer perimeter rim 326 and the inner perimeter rim 328.

The lower housing 108 can define an outer circumferential rim 324, wherein the circumferential rim 324 fits into the annular relief channel 330 of the cap 102 when the cap 102 engages the lower housing 108.

The lower housing 108 further can further define an inner circumferential rim 320, the inner circumferential rim 320 separated from the outer circumferential rim by an annular seal channel 322. The filter restriction indicator 100 can further include a compression gasket 334 disposed within the annular seal channel 322. The compression gasket 334 can be compressed by the inner perimeter rim 328 when the cap 102 engages the lower housing 108. In some embodiments, the compression gasket 334 can be an O-ring, such as a rubber or elastomeric O-ring. In some embodiments, the O-ring can have a size (CS) of about 0.5, 1, 1.5, 2, 2.5, 3, 3.5, or 4 mm (or a size falling within a range between any of the forgoing. In some embodiments, the O-ring can have a diameter (ID) of about 15, 20, 25, 30, 35, 40, 45, 50, 60, 75, 100 mm or more (or a diameter falling within a range between any of the forgoing.

The cap 102 can define an interior volume 332. An electronics control cartridge can be configured to fit within the interior volume 332 of the cap 102. The electronics control cartridge can include an internal spacer frame 304, a first circuit board 346, a second circuit board 302 disposed over the first circuit board 346, and a pressure sensor 336 in electrical communication with the first circuit board 346. The electronics control cartridge can also include a battery 306 in electrical communication with the first circuit board 346. The electronics control cartridge can also include a filter fluid tube 318 disposed below the first circuit board 346. The internal spacer frame 304 can be configured to secure the first circuit board 346 at a fixed distance from the second circuit board 302 with an air gap disposed between the first 346 and second 302 circuit boards The lower housing 108 can define an ambient pressure port 310. The ambient pressure port 310 can be in fluid communication with an interior chamber 338 of the lower housing 108. The interior chamber 338 can, in turn, but in fluid communication with the interior volume 332.

The pressure sensor 336 can be disposed on or adjacent to a first circuit board 346. A top side of the pressure sensor 336 can be in fluid communication with the interior volume 332 (and therefore the interior chamber 338 and the ambient pressure port 310). Thus, a top side of the pressure sensor 336 can be exposed to a pressure indicative of ambient pressure.

The filter fluid tube 318 can be disposed below the first circuit board 346. The filter fluid tube 318 can define at least a portion of a filter fluid channel 348. The filter fluid channel 348 can be in fluid communication with the pressure sensor 336. Thus, a bottom side of the pressure sensor 336 can be in fluid communication with the filter fluid channel 348. Thus, a bottom side of the pressure sensor 336 can be exposed to a pressure from a filter housing (not shown in this view), which can be used to determine the degree of restriction associated with the filter element in the filter housing.

The lower housing 108 further can further define a central recess 352 configured to receive the filter fluid tube 318. The filter restriction indicator 100 can further include a deformable seal 316 disposed around a lower portion of the filter fluid tube 318. The deformable seal 316 can provide a seal between an outer diameter of the filter fluid tube 318 and an inner diameter of the central recess 352 of the lower housing 108. The lower housing 108 can further define a plug port 350, configured to receive a plug or fitting from a filtration system (e.g., the filtration system of which the degree of restriction is to be assessed). Many different plug or fitting types are contemplated herein. In the context of plug or fitting systems with male/female portions, it will be appreciated the male portion can be on either the filter restriction indicator side or the filtration system side. Similarly, the female portion can be on either the filter restriction indicator side or the filtration system side, provided that one side has the male portion and one side has the female portion. Many different types of threaded and non-threaded connections are contemplated herein. Thread standards can include NPT, PT, G, BSPT, JIS, SAE, Metric and the like. Other connections contemplated herein can include hose stem style connections, IVI connections, and the like.

In some embodiments, the plug port 350 can be configured to fit a 1/8th NPT fitting. In some embodiments, the inside surfaces of the plug port 350 can be threaded to facilitate connection between the plug port 350 and a plug from a filtration system.

The filter restriction indicator 100 can further include a breather filter 308 disposed over an exterior portion of the ambient pressure port 310. In this way, the breather filter 308 can prevent contaminants from the external environment from entering the ambient pressure port 310 and other elements in fluid communication therewith.

The lower housing 108 can be formed of a polymer, a glass, a metal, a ceramic, a composite, or the like. In some embodiments, the lower housing 108 is formed of a polymer, such as a thermoset polymer. In some embodiments, the lower housing 108 is formed of a polymer such as a polyamide polymer (such as NYLON). In some embodiments, the lower housing 108 can be formed of a glass-filled polymer.

Figure 4:
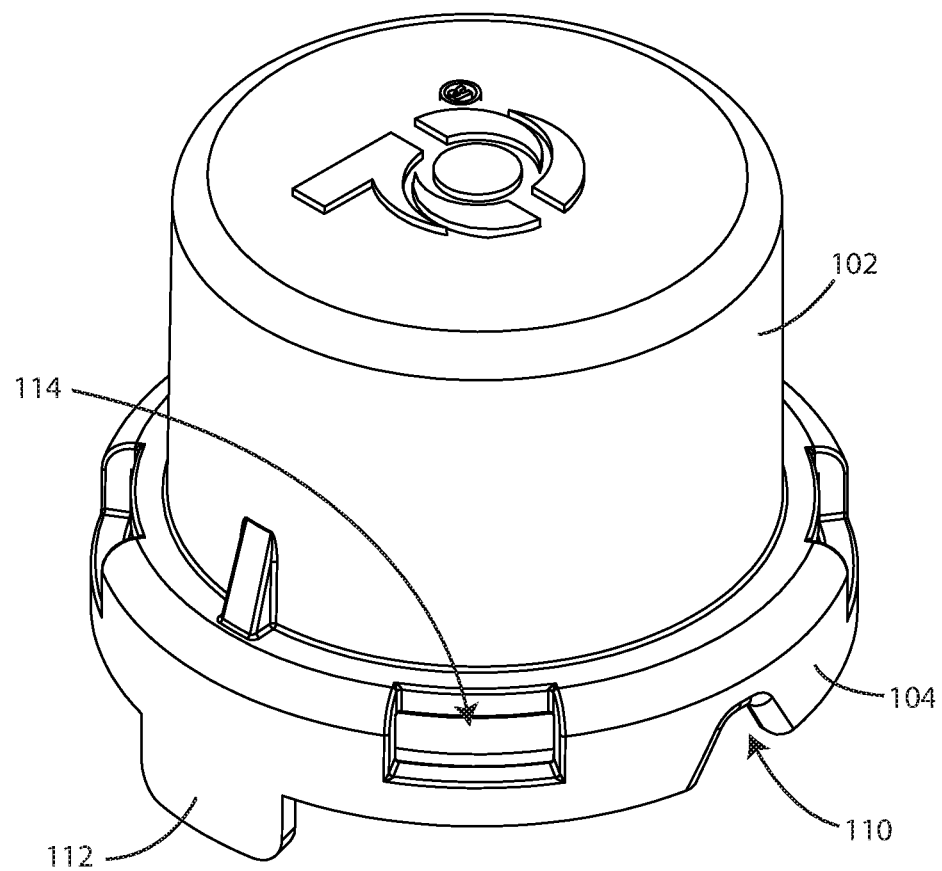
FIG. 4 is a perspective view of a cap of a filter restriction indicator in accordance with various embodiments herein.

Referring now to FIG. 4, a perspective view is shown of a cap 102 of a filter restriction indicator in accordance with various embodiments herein. The cap 102 can define an interior volume. The cap 102 can be configured to engage the lower housing 108. The cap 102 can define a shielding panel 112 configured to fit over an exterior portion of an ambient pressure port (not shown in this view) when the cap 102 is engaged with the lower housing 108.

Figure 5:
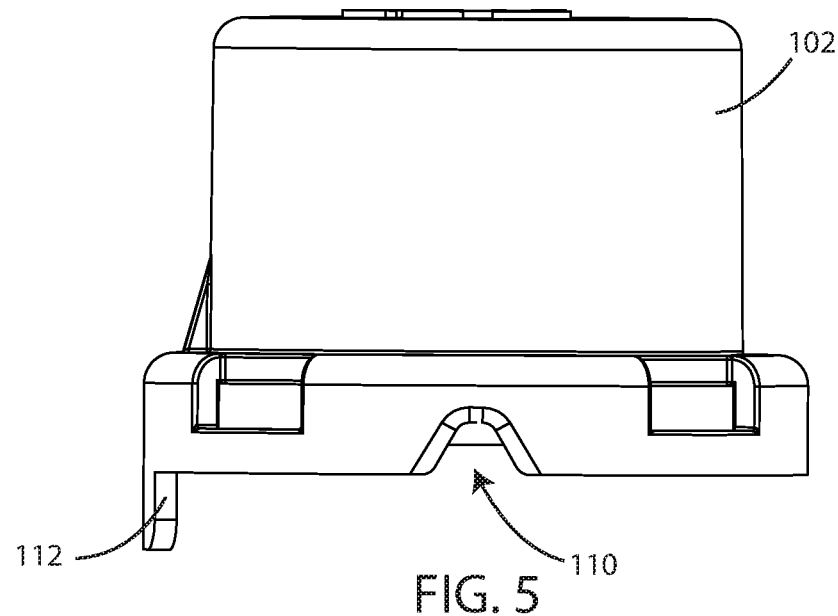
FIG. 5 is an elevation view of a cap of a filter restriction indicator in accordance with various embodiments herein.
Figure 6:
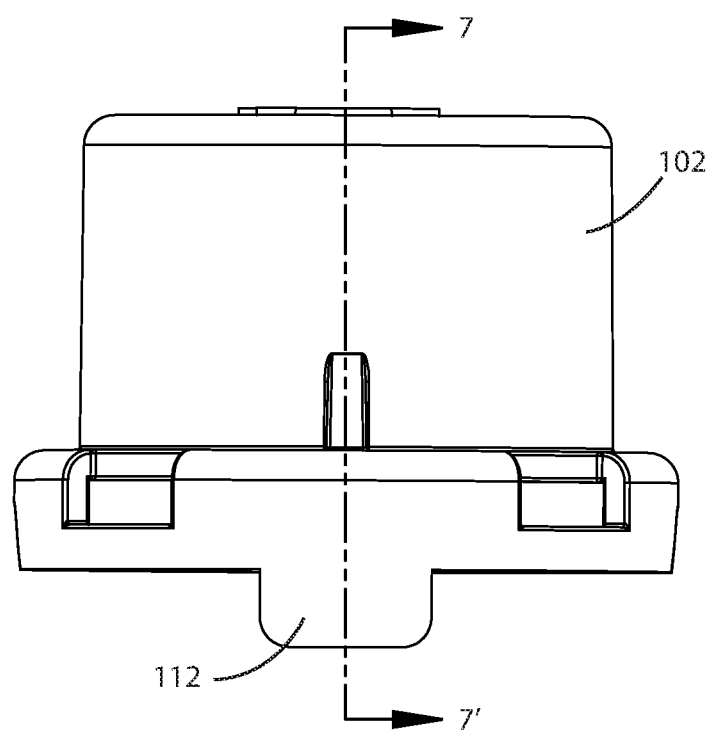
FIG. 6 is an elevation view of a cap of a filter restriction indicator in accordance with various embodiments herein.

The cap 102 can define one or more receiving windows 114 into which a tongue 106 of the lower housing 108 can fit. The cap 102 can include a lower perimeter rim 104. The lower perimeter rim 104 can define one or more flexural relief indent 110. The flexural relief indent(s) 110 can allow the bottom portion of the lower perimeter rim 104 to flex outwardly more easily than if a flexural relief indent 110 was not included. FIG. 2 shows a top plan view the filter restriction indicator 100 in accordance with various embodiments herein. Referring now to FIG. 5, an elevation view is shown of a cap of a filter restriction indicator in accordance with various embodiments herein. Referring now to FIG. 6, an elevation view is shown of a cap of a filter restriction indicator in accordance with various embodiments herein.

Figure 7:
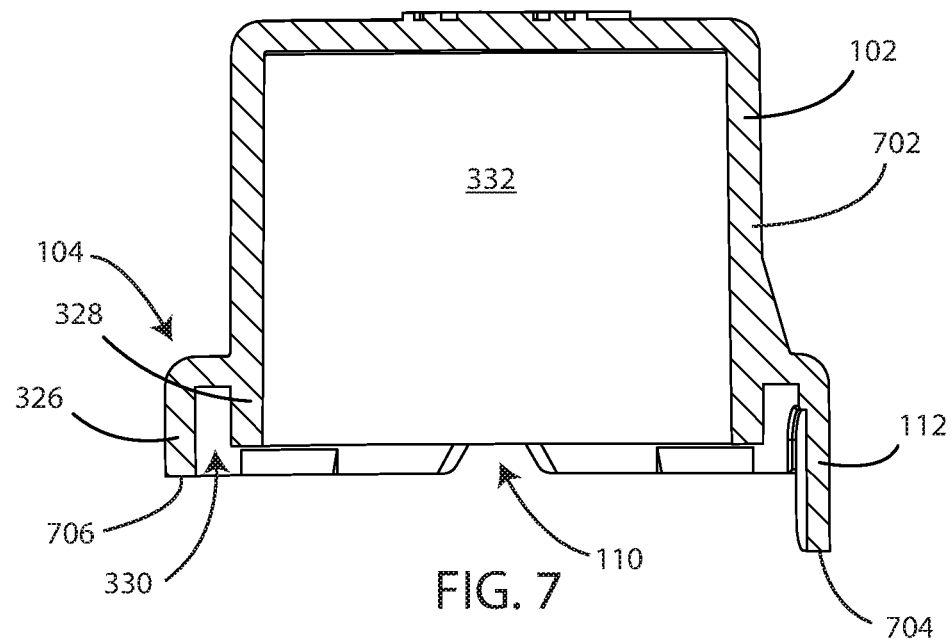
FIG. 7 is a sectional view of a cap of a filter restriction indicator as taken along line 7-7' of FIG. 6 in accordance with various embodiments herein.

Referring now to FIG. 7, a sectional view is shown of a filter restriction indicator cap 102 as taken along line 7-7' of FIG. 6 in accordance with various embodiments herein. The cap 102 can define an interior volume 332. The interior volume 332 can be of various sizes. In some embodiments, the interior volume 332 can be about 10, 25, 50, 100, 200 or 500 ml in volume, or an amount falling within a range between any of the foregoing. The cap 102 can include wall members 702. The wall members can be of various thickness and materials. In some embodiments, the wall member can have an average thickness of about 0.5, 1, 2, 3, 4, 5, or 7.5 mm, or a thickness falling within a range between any of the foregoing. The cap 102 can be formed of a polymer, a glass, a metal, a ceramic, a composite, or the like. In some embodiments, the cap 102 is formed of a polymer, such as a thermoset polymer. In some embodiments, the cap 102 is formed of a polymer such as a polyamide polymer (such as NYLON). In some embodiments, the cap 102 can be formed of a glass-filled polymer.

The cap 102 can include a lower perimeter rim 104. The lower perimeter rim 104 can be divided into an outer perimeter rim 326 and an inner perimeter rim 328. The lower perimeter rim 104 can define an annular relief channel 330 disposed between the outer perimeter rim 326 and the inner perimeter rim 328.

The cap 102 defines a shielding panel 112 configured to fit over an exterior portion of an ambient pressure port (not shown in this view) when the cap 102 is engaged with the lower housing 108. The shielding panel 112 can extend downward to a point below the rest of the lower perimeter rim 104. In some embodiments, a lower edge 704 of the shielding panel 112 can be about 0.5, 1, 2, 3, 5, 7.5, 10, or 15 mm lower (or an amount falling within a range between any of the foregoing) than the lowest point 706 (or bottom lip edge) of the rest of the lower perimeter rim 104. The shielding panel 112 can advantageously protect components thereunder (such as breather filter 308) from exposure to dirt and other debris that may be present in the environment in the area where the filter restriction indicator 100 is installed. As such, the shielding panel 112 can allow the breather filter 308 to be installed on an outside surface of the lower housing 108, which can provide a manufacturability advantage.

The lower perimeter rim 104 can define one or more flexural relief indent 110. The flexural relief indent(s) 110 can allow the bottom portion of the lower perimeter rim 104 to flex outwardly more easily than if a flexural relief indent 110 was not included. The size of the flexural relief indent(s) 110 can vary. In some embodiments, the flexural relief indent can extend inward from the bottom lip edge of the lower perimeter rim 104 about 0.1, 0.2, 0.3, 0.5, 1, 2, 3, or 5 mm, or an amount falling within a range between any of the foregoing. The flexural relief indent 110 can have various shapes. In some embodiments, the flexural relief indent 110 can be triangular, trapezoidal, polygonal, curvilinear, or the like.

Figure 8:
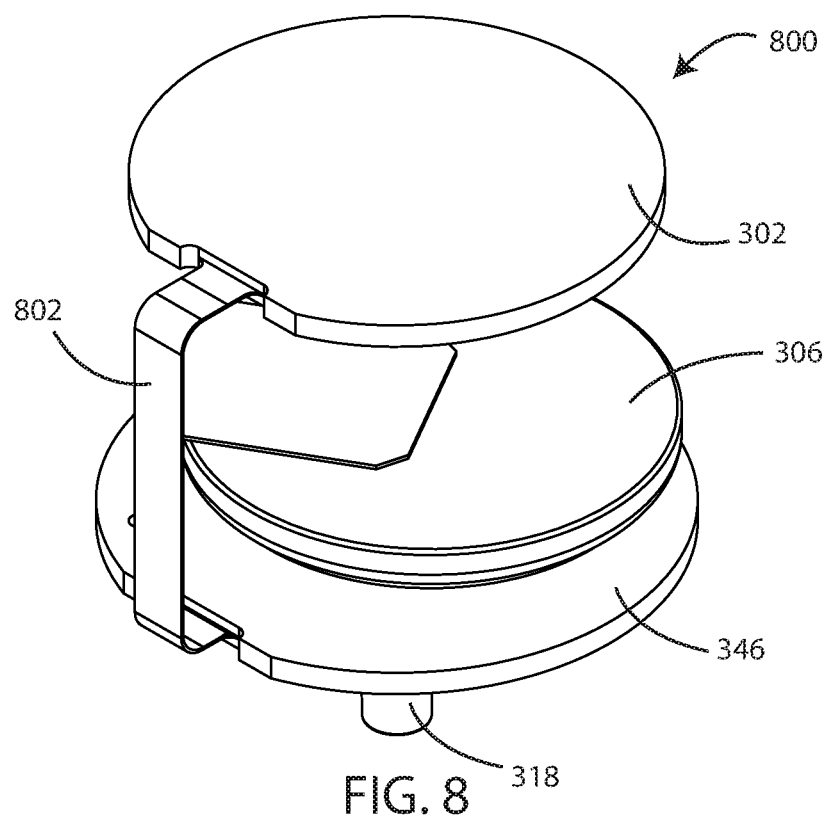
FIG. 8 is a perspective view of components of an electronics control cartridge in accordance with various embodiments herein.
Figure 9:
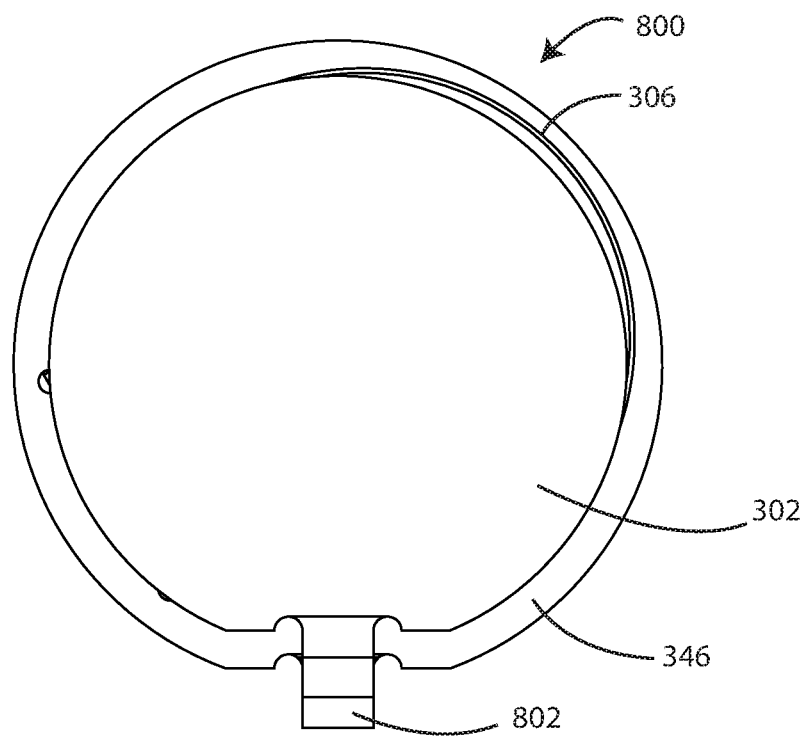
FIG. 9 is a top plan view of components of an electronics control cartridge in accordance with various embodiments herein.

Referring now to FIG. 8, a perspective view is shown of components of an electronics control cartridge 800 in accordance with various embodiments herein. The electronics control cartridge 800 can include an internal spacer frame (not shown in this view), a first circuit board 346, a second circuit board 302 disposed over the first circuit board 346, and a pressure sensor (not shown in this view), and a filter fluid tube 318 disposed below the first circuit board 346. The electronics control cartridge 800 can also include an electrically conductive cable 802 (or ribbon wire) providing electrical communication between components of the first circuit board 346 and components of the second circuit board 302. Referring now to FIG. 9, a top plan view is shown of components of an electronics control cartridge 800 in accordance with various embodiments herein.

Figure 10:
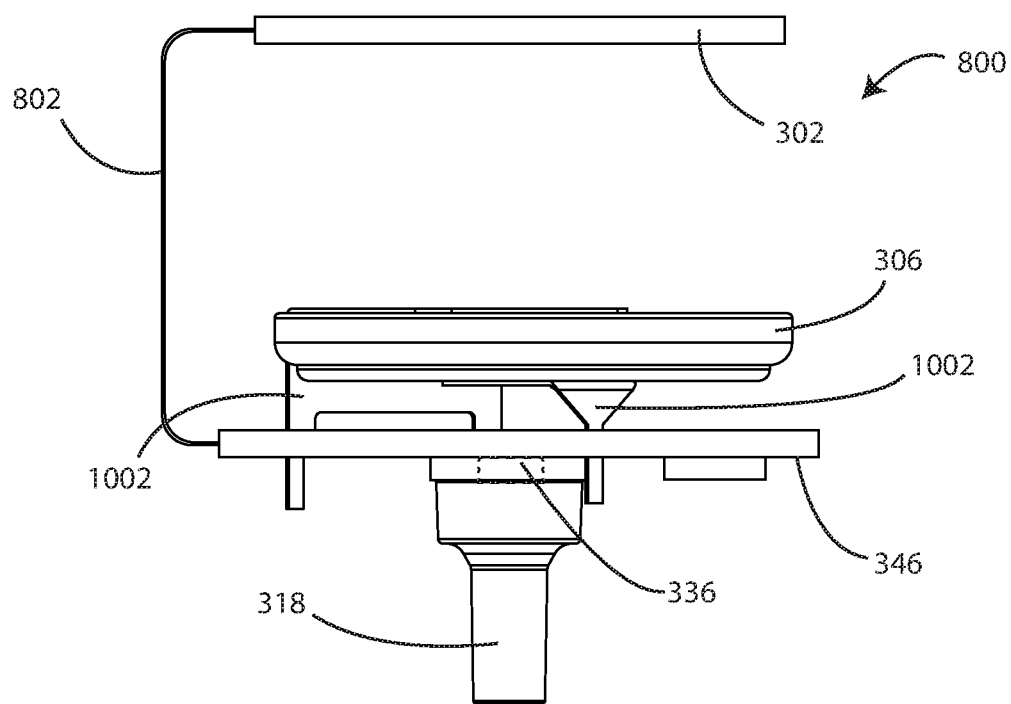
FIG. 10 is an elevation view of components of an electronics control cartridge in accordance with various embodiments herein.

Referring now to FIG. 10, an elevation view is shown of components of an electronics control cartridge 800 in accordance with various embodiments herein. Standoffs 1002 can be used to mount the battery 306 over the first circuit board 346. Thus, as the battery 306 can be mounted on standoffs 1002, a gap can be provided between the first circuit board 346 and the battery 306. The standoffs 1002 can also be used to provide electrical communication between the battery 306 and the first circuit board 346. The filter fluid tube 318 can be disposed below the first circuit board 346. In some embodiments, the filter fluid tube 318 can be integral with the first circuit board 346. In some embodiments, the filter fluid tube 318 can be formed of a different material than the first circuit board 346 but can be affixed thereto by mechanical means, an adhesive, or the like.

Figure 11:
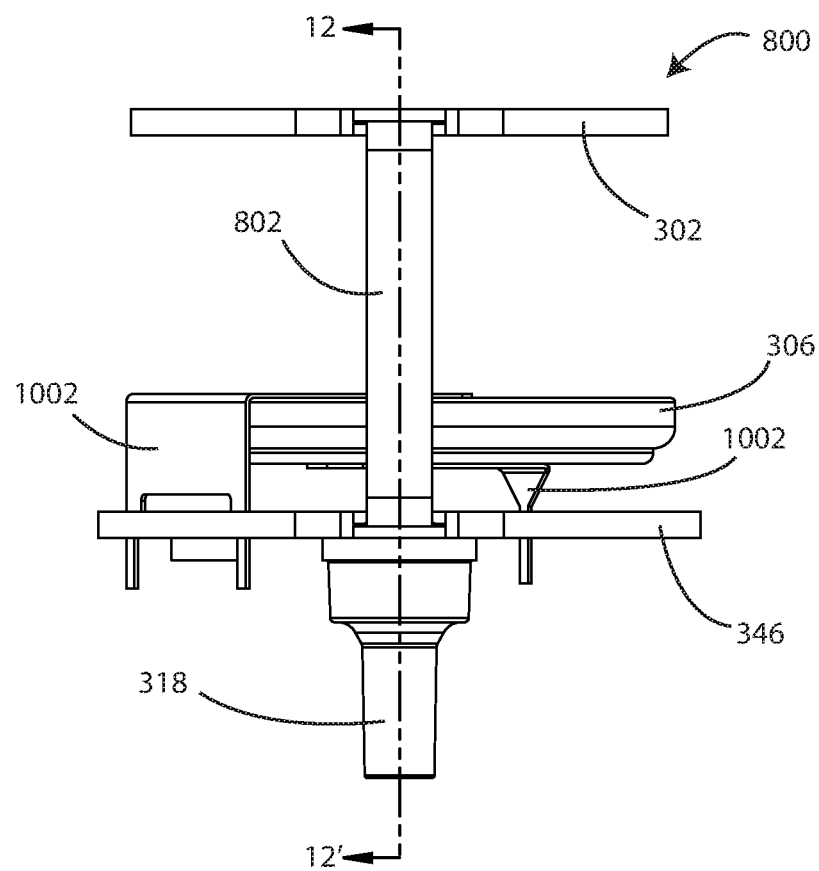
FIG. 11 is an elevation view of components of an electronics control cartridge in accordance with various embodiments herein.
Figure 12:
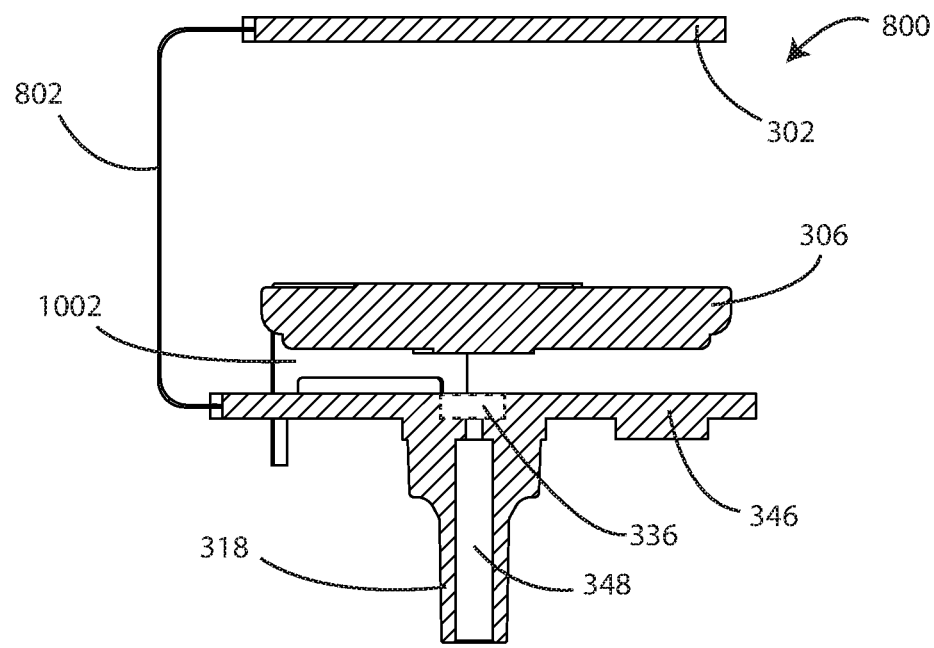
FIG. 12 is a sectional view of components of an electronics control cartridge as taken along line 12-12' of FIG. 11 in accordance with various embodiments herein.

The pressure sensor 336 can be disposed below or adjacent to the first circuit board 346. Referring now to FIG. 11, an elevation view is shown of components of an electronics control cartridge 800 in accordance with various embodiments herein. Referring now to FIG. 12, a sectional view is shown of components of an electronics control cartridge 800 as taken along line 12-12' of FIG. 11 in accordance with various embodiments herein.

Figure 13:
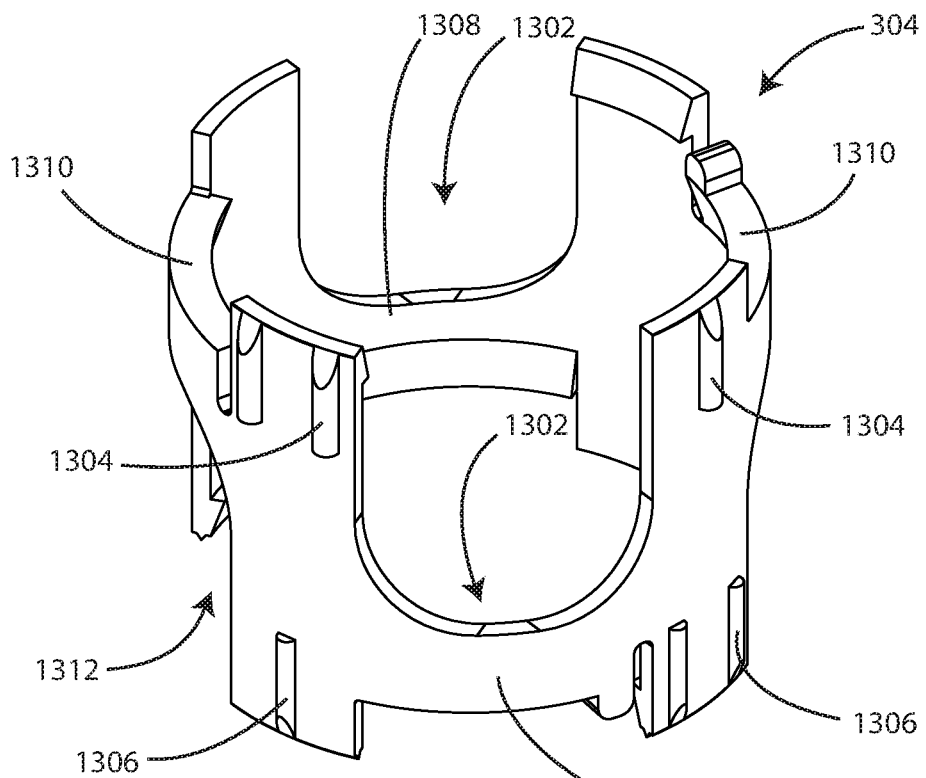
FIG. 13 is a perspective view of an internal spacer frame in accordance with various embodiments herein.

Referring now to FIG. 13, a perspective view is shown of an internal spacer frame 304 in accordance with various embodiments herein. The internal spacer frame 304 can include comprises lower lateral perimeter struts 1308 and upper lateral perimeter struts 1310. While not shown in this view, the electrically conductive cable 802 can pass over an outside surface of at least one of the upper or lower lateral perimeter struts 1308, 1310.

In various embodiments, the internal spacer frame 304 can define top openings 1302 and bottom openings 1312. The top openings 1302 can extend downward from the top of the internal spacer frame 304 to the lower lateral perimeter struts 1308. The bottom openings 1312 can extend upward from the bottom of the internal spacer frame 304 to the upper lateral perimeter struts 1310. In some embodiments, the top openings 1302 and bottom openings 1312 can be substantially "U"-shaped, with the shape of the top openings 1302 inverted with respect to the shape of the bottom openings 1312. In some embodiments, the height of the top openings 1302 can be about 20, 30, 40, 50, 60, 70, 80, 90, or 95 percent of the overall height of the internal spacer frame 304 (or an amount falling within a range between any of the foregoing. In some embodiments, the height of the bottom openings 1312 can be about 20, 30, 40, 50, 60, 70, 80, 90, or 95 percent of the overall height of the internal spacer frame 304 (or an amount falling within a range between any of the foregoing. In some embodiments, the top openings 1302 and bottom openings 1312 can be substantially the same size. In other embodiments, the top openings 1302 and bottom openings 1312 can be of different sizes. In some embodiments, there are two top openings 1302 positioned on opposite lateral sides of the internal spacer frame 304 and two bottom openings 1312 positioned on opposite lateral sides of the internal spacer frame 304. In some embodiments, a line connecting centers of the two top openings 1302 is substantially perpendicular to a line connecting centers of the two bottom openings 1312.

In various embodiments, the internal spacer frame 304 can include a plurality of upper spacing ridges 1304 on an outside perimeter surface thereof. In various embodiments, the internal spacer frame 304 can include a plurality of lower spacing ridges 1306 on an outside perimeter surface thereof. The spacing ridges 1304, 1306 can be configured to interface with an inside surface of the cap 102 when the electronics control cartridge is positioned within the interior volume 332 of the cap 102.

The internal spacer frame 304 can be formed of a polymer, a glass, a metal, a ceramic, a composite, or the like. In some embodiments, the internal spacer frame 304 is formed of a polymer, such as a thermoset polymer. In some embodiments, the internal spacer frame 304 is formed of a polymer such as a polyamide polymer (such as NYLON). In some embodiments, the internal spacer frame 304 can be formed of a glass-filled polymer.

Figure 14:
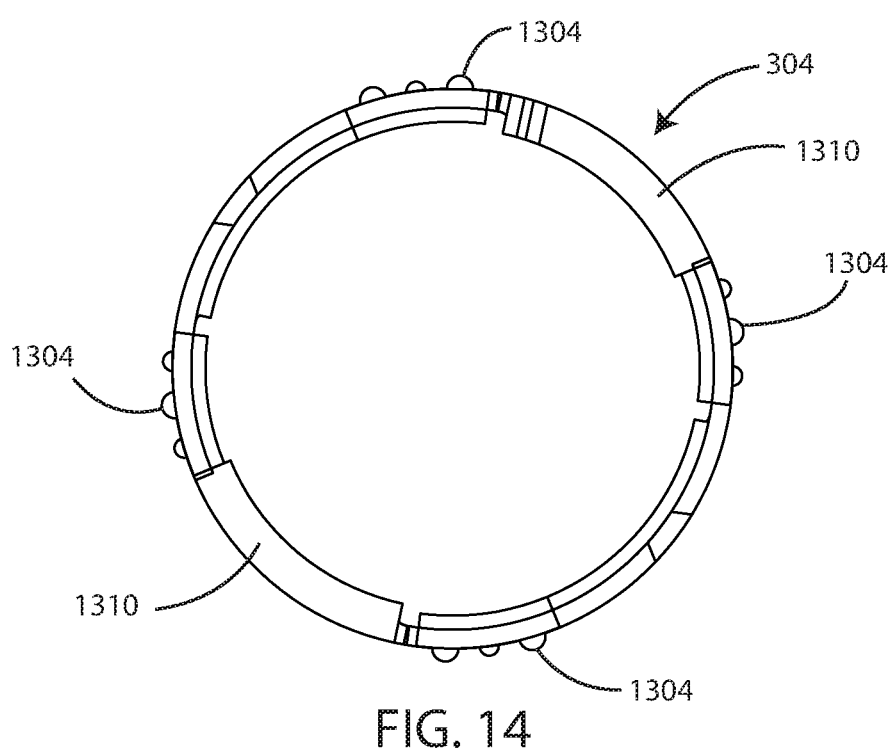
FIG. 14 is a top plan view of an internal spacer frame in accordance with various embodiments herein.

Referring now to FIG. 14, a top plan view is shown of an internal spacer frame 304 in accordance with various embodiments herein. In various embodiments, the outer perimeter of the internal spacer frame 304 is substantially circular and the internal spacer frame 304 itself is substantially cylindrical. However, various other shapes are contemplated herein.

Figure 15:
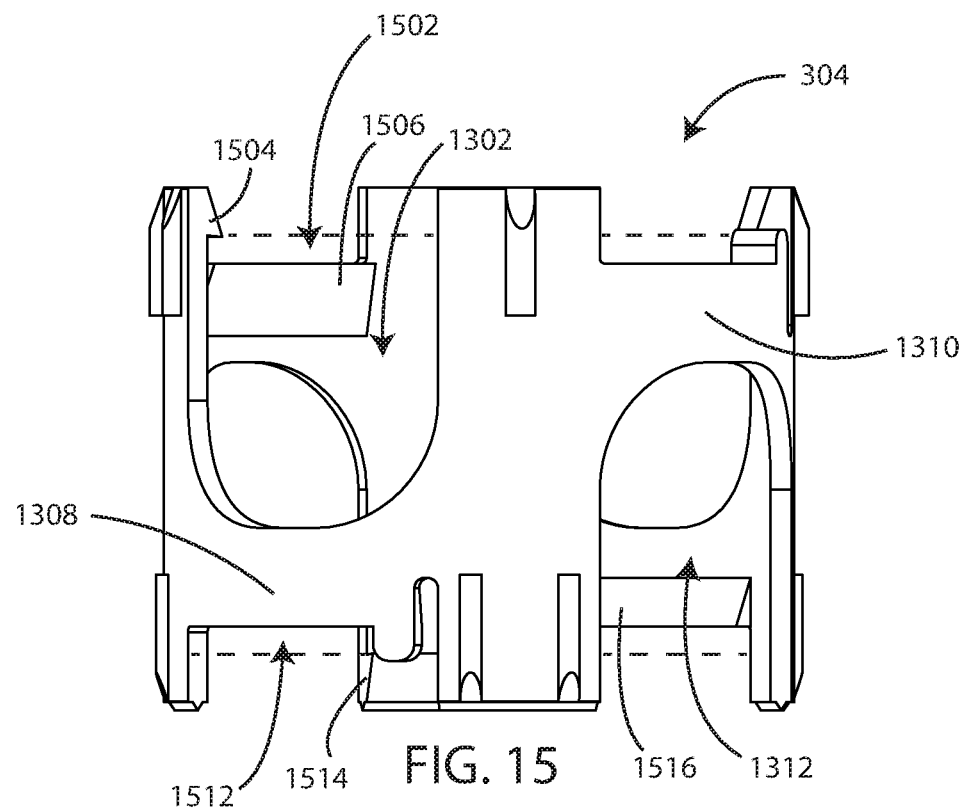
FIG. 15 is an elevation view of an internal spacer frame in accordance with various embodiments herein.
Figure 16:
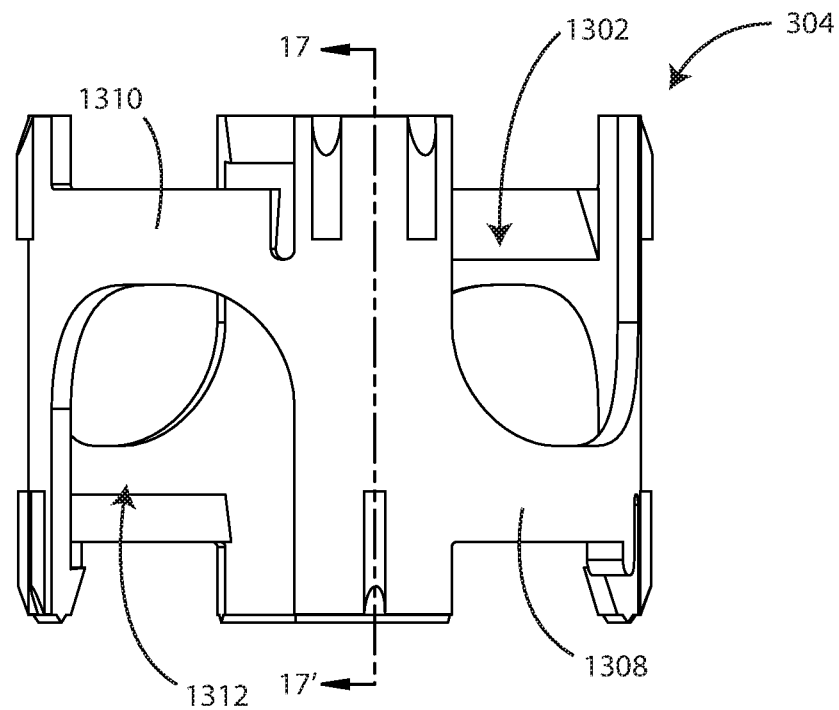
FIG. 16 is an elevation view of an internal spacer frame in accordance with various embodiments herein.
Figure 17:
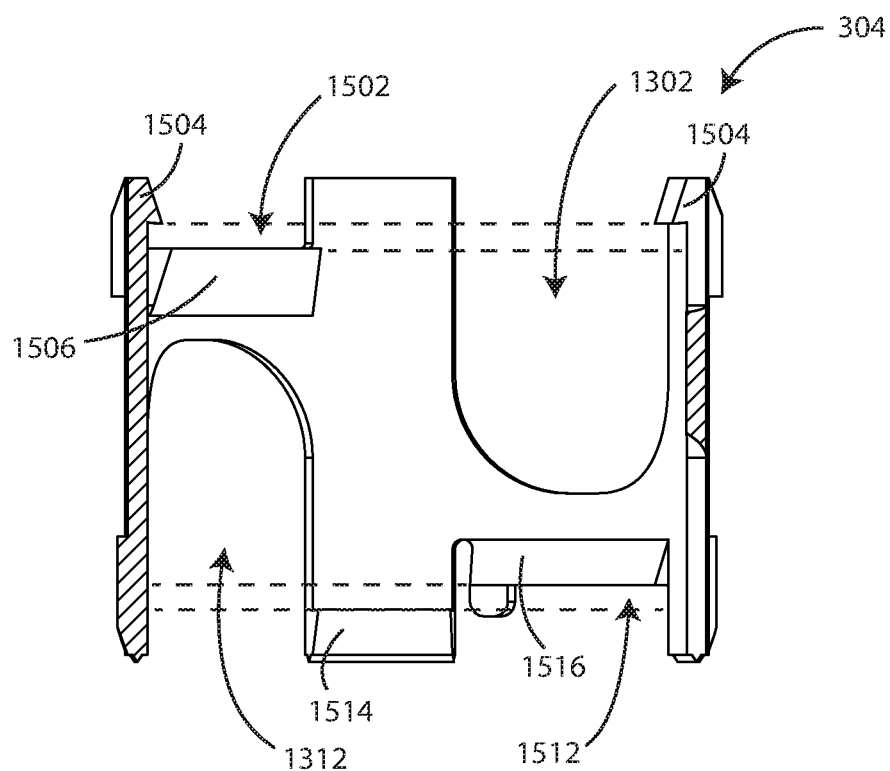
FIG. 17 is a sectional view of an internal spacer frame as taken along line 17-17' of FIG. 16 in accordance with various embodiments herein.

Referring now to FIG. 15, an elevation view is shown of an internal spacer frame 304 in accordance with various embodiments herein. The internal spacer frame 304 can include an upper snap fit channel to 1502 receive the second circuit board and a lower snap fit channel 1512 to receive the first circuit board. The upper 1502 and lower 1512 snap fit channels can be formed by opposed offset jaws 1504, 1506 and 1514, 1516. The upper snap fit channel 1502 can be oriented for insertion of the second circuit board from the top of the upper snap fit channel 1502 and the lower snap fit channel 1512 can be oriented for insertion of the first circuit board from the bottom of the lower snap fit channel 1512. Referring now to FIG. 16, an elevation view is shown of an internal spacer frame 304 in accordance with various embodiments herein. Referring now to FIG. 17, a sectional view is shown of an internal spacer frame 304 as taken along line 17-17' of FIG. 16 in accordance with various embodiments herein.

Figure 18:
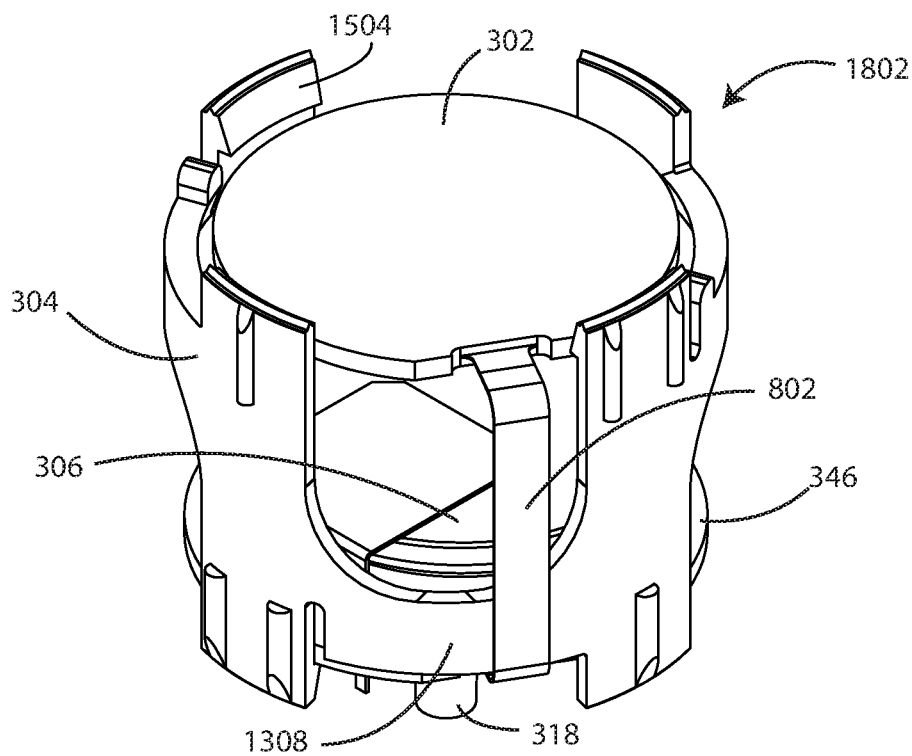
FIG. 18 is a perspective view of an electronics control cartridge in accordance with various embodiments herein.

Referring now to FIG. 18, a perspective view is shown of an electronics control cartridge 1802 in accordance with various embodiments herein. The electronics control cartridge 1802 can include an internal spacer frame 304, a battery 306, a first circuit board 346, a second circuit board 302 disposed over the first circuit board 346, a cable 802 interconnecting the first circuit board 346 and the second circuit board 302, and a filter fluid tube 318 disposed below the first circuit board 346, amongst other components. In this view, it can be seen that the electrically conductive cable 802 can pass over an outside surface of a lateral perimeter strut 1308. In this view, the first circuit board 346 is inserted into the lower snap fit channel 1512 and the second circuit board 302 is inserted into the upper snap fit channel 1502.

Figure 19:
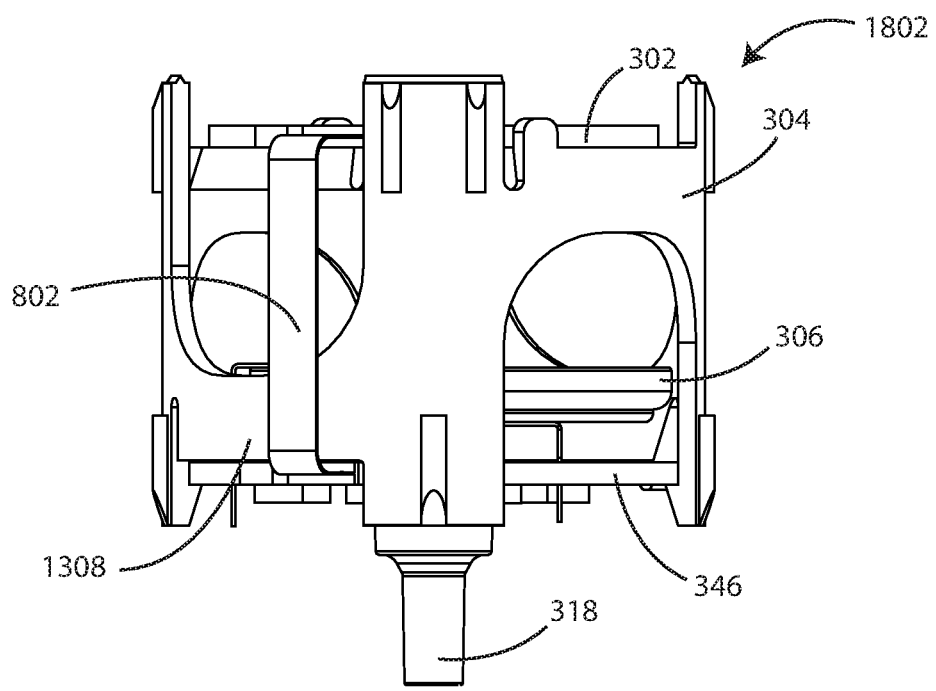
FIG. 19 is an elevation view of an electronics control cartridge in accordance with various embodiments herein.
Figure 20:
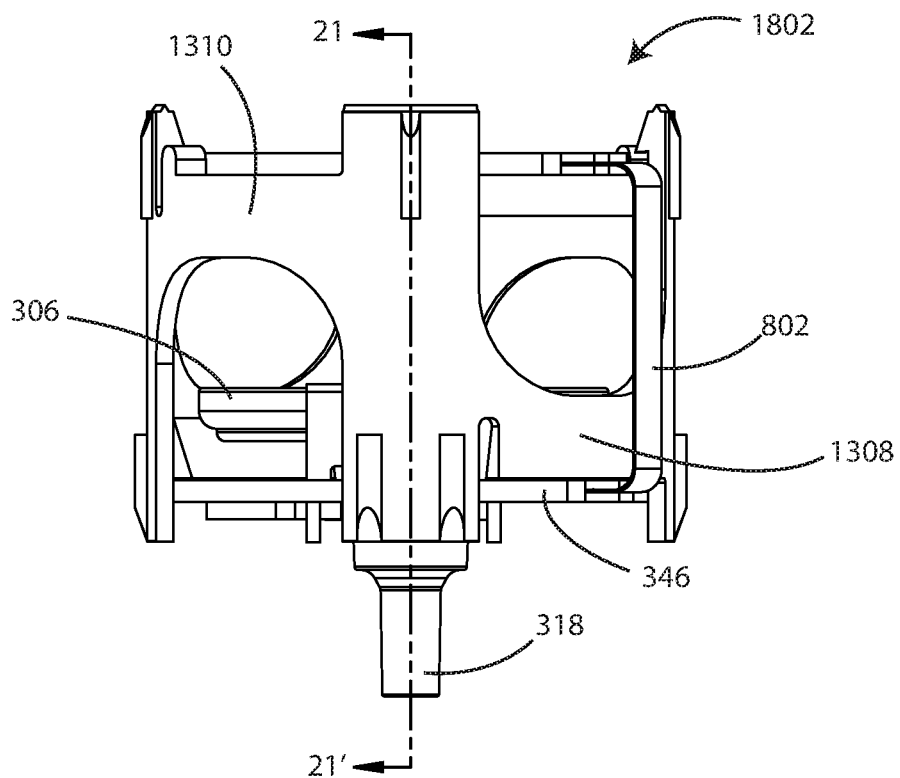
FIG. 20 is an elevation view of an electronics control cartridge in accordance with various embodiments herein.
Figure 21:
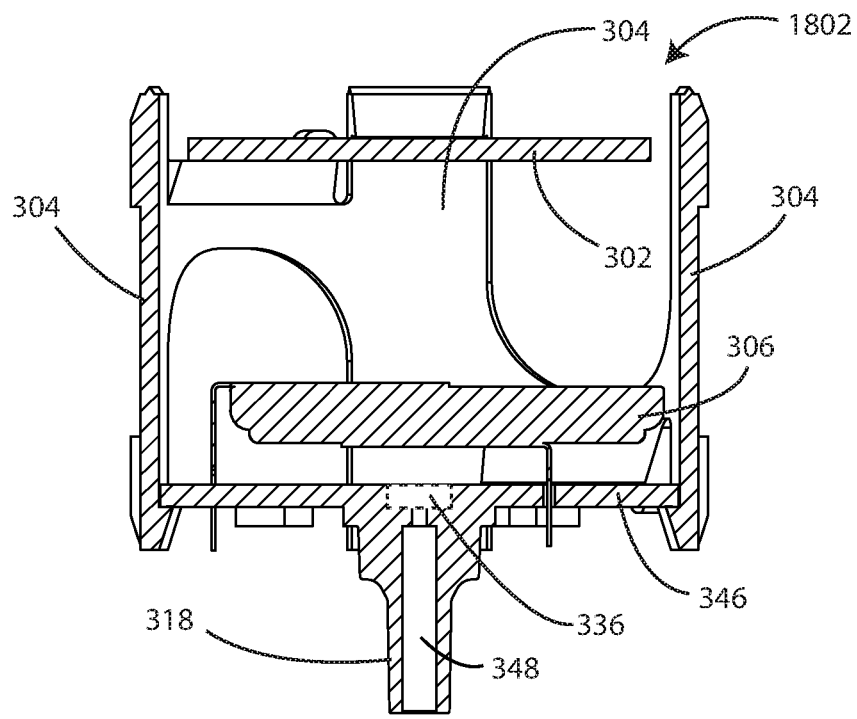
FIG. 21 is a sectional view of an electronics control cartridge as taken along line 21-21' of FIG. 20 in accordance with various embodiments herein.

In this manner, the distance between the first circuit board 346 and the second circuit board 302 can be fixed, despite vibration and other motion which may otherwise cause slight variation in the distance between the first circuit board 346 and the second circuit board 302. Referring now to FIG. 19, an elevation view is shown of an electronics control cartridge 1802 in accordance with various embodiments herein. Referring now to FIG. 20, an elevation view is shown of an electronics control cartridge 1802 in accordance with various embodiments herein. Referring now to FIG. 21, a sectional view is shown of an electronics control cartridge 1802 as taken along line 21-21' of FIG. 20 in accordance with various embodiments herein.

Figure 22:
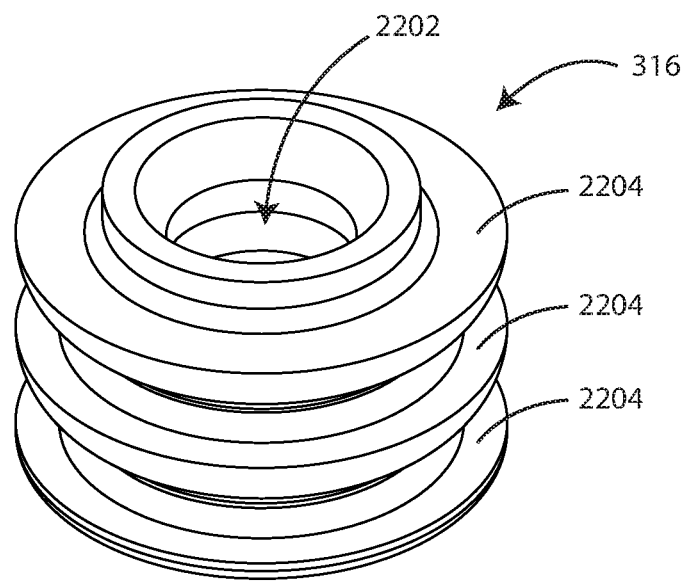
FIG. 22 is a perspective view of a deformable seal in accordance with various embodiments herein.
Figure 23:
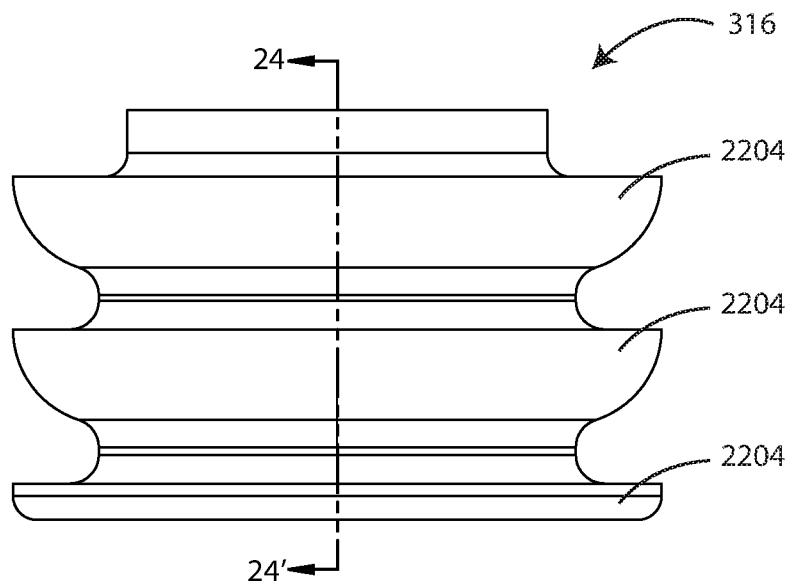
FIG. 23 is an elevation view of a deformable seal in accordance with various embodiments herein.
Figure 24:
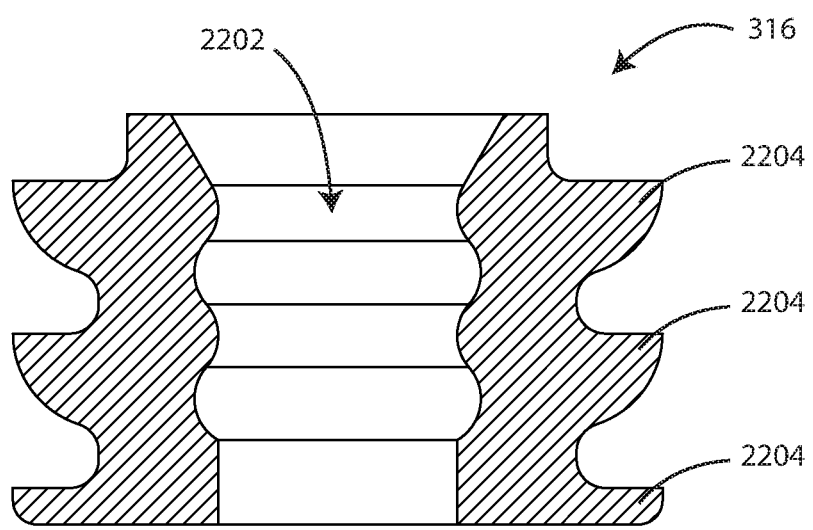
FIG. 24 is a sectional view of a deformable seal as taken along line 24-24' of FIG. 23 in accordance with various embodiments herein.

Referring now to FIG. 22, a perspective view is shown of a deformable seal 316 in accordance with various embodiments herein. The deformable seal 316 can be disposed around a lower portion of the filter fluid tube 318. The deformable seal 316 can define a central aperture 2202 in order to accommodate the filter fluid tube 318. The deformable seal 316 can provide a seal between an outer diameter of the filter fluid tube 318 and an inner diameter of the central recess 352 of the lower housing 108. In various embodiments, the deformable seal 316 can include a plurality of annular ridges 2204 disposed on an outside surface thereof. The deformable seal 316 can be made of various materials. In some embodiments, the deformable seal 316 can be formed of an elastomeric polymer. In some embodiments, the deformable seal 316 can be formed of a soft polymer. In some embodiments, the deformable seal 316 can be formed of an adhesive composition. Referring now to FIG. 23, an elevation view is shown of a deformable seal 316 in accordance with various embodiments herein. Referring now to FIG. 24, a sectional view is shown of a deformable seal 316 as taken along line 24-24' of FIG. 23 in accordance with various embodiments herein.

Figure 25:
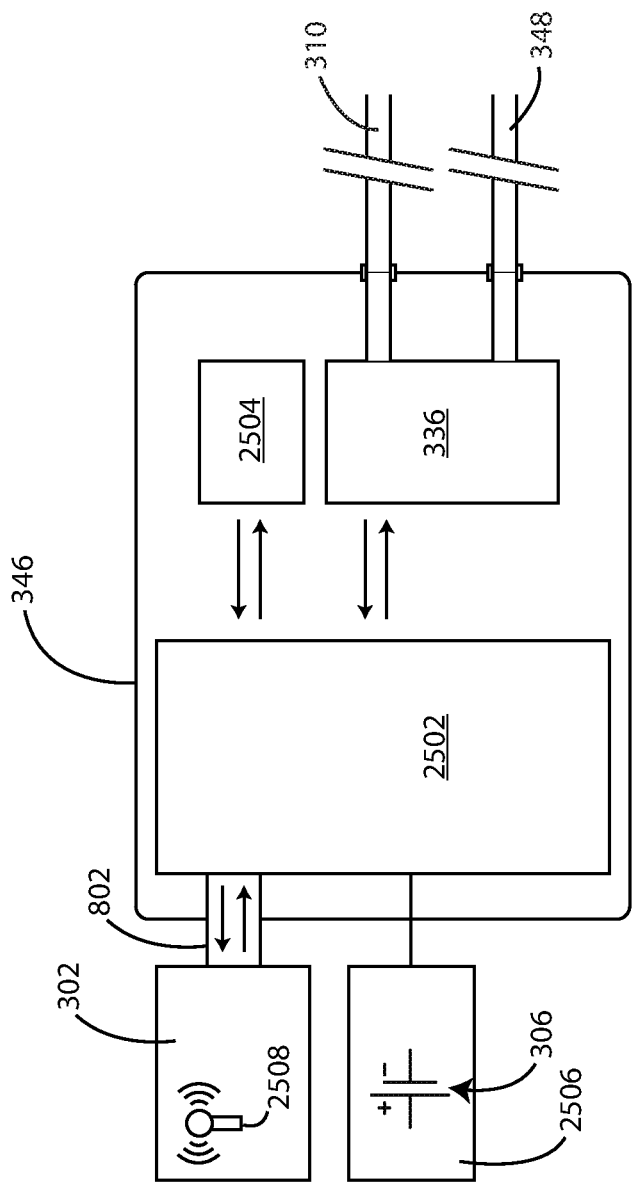
FIG. 25 is a schematic diagram of some elements of a filter restriction indicator in accordance with various embodiments herein.

Referring now to FIG. 25, a schematic diagram is shown of some elements of a filter restriction indicator in accordance with various embodiments herein. It will be appreciated that a greater or lesser number of components can be included with various embodiments and that this schematic diagram is merely illustrative. The first circuit board 346 can include control circuitry disposed thereon to control operation of the filter restriction indicator. For example, in some embodiments, the first circuit board 346 can include a control circuit 2502. The control circuit 2502 can include various electronic components including, but not limited to, a microprocessor, a microcontroller, a FPGA (field programmable gate array) chip, an application specific integrated circuit (ASIC), or the like.

In various embodiments, a pressure sensor 336 (as used herein, reference to a pressure sensor shall include a pressure transducer unless the context dictates otherwise) can be disposed on or underneath the first circuit board 346. The pressure sensor 336 can be in fluid communication with ambient pressure port 310. The pressure sensor 336 can also be in fluid communication with filter fluid channel 348.

In some embodiments, a first side or surface of the pressure sensor 336 is in fluid communication with the ambient pressure port 310 and a second side or surface of the pressure sensor 336 is in fluid communication with filter fluid channel 348.

In various embodiments, an auxiliary sensor 2504 can be included and convey data to the control circuit 2502. The auxiliary sensor 2504 can include, but is not limited to, a temperature sensor, an NFC sensor, a magnetic field sensor, an accelerometer, and the like.

Pressure sensors herein can be of various types and can specifically include differential pressure sensors. Pressure sensors can include, but are not limited to, strain gauge type pressure sensors, capacitive type pressure sensors, piezoelectric type pressure sensors, and the like. In some embodiments, pressure sensors herein can be MEMS-based pressure sensors. Exemplary pressure sensors are commercially available from Honeywell, Omron, NXP, Bosch and the like. In some embodiments, one or more piezoresistors can be mounted on a diaphragm. A pressure change causes a strain in the diaphragm and the resistors. The resistor values change in proportion to the stress applied, which produces an electrical output. Other modes of action for pressure sensors are also contemplated herein.

The processing power of the control circuit 504 and components thereof can be sufficient to perform various operations including various operations on data from sensors (such as pressure sensors 336 and auxiliary sensor 2504) including, but not limited to averaging, time-averaging, statistical analysis, normalizing, aggregating, sorting, deleting, traversing, transforming, condensing (such as eliminating selected data and/or converting the data to a less granular form), compressing (such as using a compression algorithm), merging, inserting, time-stamping, filtering, discarding outliers, calculating trends and trendlines (linear, logarithmic, polynomial, power, exponential, moving average, etc.), predicting filter element EOL (end of life), identifying an EOL condition, predicting performance, predicting costs associated with replacing filter elements vs. not-replacing filter elements, and the like.

Normalizing operations performed by the control circuit 2502 can include, but are not limited to, adjusting one or more values based on another value or set of values. As just one example, pressure drop data reflective of pressure drop across a filter element can normalized by accounting for air flow rate or a value that serves as a proxy thereof.

In various embodiments the control circuit can calculate a time for replacement of a filter element and generate a signal regarding the time for replacement. In various embodiments, the control circuit can calculate a time for replacement of a filter element and issue a notification regarding the time for replacement through a user output device. In various embodiments, the control circuit can calculate a time for replacement of a filter element based on signals from the pressure sensor 336. In various embodiments, the control circuit can calculate a time for replacement of a filter element based on signals from the pressure sensor 336 and the auxiliary sensor 2504 and/or an external input. The external input can be received from a system user or from a remote location through a data communication network.

In various embodiments, control circuit initiates an alarm if a predetermined alarm condition has been met. The alarm condition can include one or more a maximum value for a signal received from the pressure sensor, a minimum value for a signal received from the pressure sensor, a maximum value for a signal received from the auxiliary sensor, a minimum value for a signal received from the auxiliary sensor, and the like.

In various embodiments, the filter restriction indicator can include a power supply circuit 2506. In some embodiments, the power supply circuit 2506 can include various components including, but not limited to, a battery 306, a capacitor, a power-receiver such as a wireless power receiver, a transformer, a rectifier, and the like.

In various embodiment the filter restriction indicator can include an output device. The output device can include various components for visual and/or audio output including, but not limited to, lights (such as LED lights), a display screen, a speaker, and the like. In some embodiments, the output device can be used to provide notifications or alerts to a system user such as current system status, an indication of a problem, a required user intervention, a proper time to perform a maintenance action, or the like.

In various embodiments the control circuit 2502 can include memory and/or a memory controller. The memory can include various types of memory components including dynamic RAM (D-RAM), read only memory (ROM), static RAM (S-RAM), disk storage, flash memory, EEPROM, battery-backed RAM such as S-RAM or D-RAM and any other type of digital data storage component. In some embodiments, the electronic circuit or electronic component includes volatile memory. In some embodiments, the electronic circuit or electronic component includes non-volatile memory. In some embodiments, the electronic circuit or electronic component can include transistors interconnected to provide positive feedback operating as latches or flip flops, providing for circuits that have two or more metastable states, and remain in one of these states until changed by an external input. Data storage can be based on such flip-flop containing circuits. Data storage can also be based on the storage of charge in a capacitor or on other principles. In some embodiments, the non-volatile memory can be integrated with the control circuit 2502.

In various embodiments the control circuit 2502 can include a clock circuit. While not shown in FIG. 25, it will be appreciated that various embodiments herein can include a data/communication bus to provide for the transportation of data between components. In some embodiments, an analog signal interface can be included. In some embodiments, a digital signal interface can be included.

In various embodiment the filter restriction indicator can include a communications circuit. In various embodiments, the communications circuit can include components such as an antenna 2508, amplifiers, filters, digital to analog and/or analog to digital converters, and the like. In various embodiments, a wireless communication antenna 2508 can be disposed on the second circuit board 302. The wireless communication antenna 2508 can be of various types. In some embodiments, the wireless communication antenna 2508 can be an inductive signaling antenna, a frequency modulation antenna, a WIFI® antenna, a BLUETOOTH® antenna, or the like.

In various embodiments, filter restriction indicators herein are designed so that they can operate using only a battery for power and not deplete the battery for a long period of time such as weeks, months, or even years. As such, in various embodiments operations of the filter restriction indicator can be optimized to conserve energy consumption.

In some embodiments herein, filter restriction indicators herein can include features to increase their stability when mounted on a filter housing (or air cleaner housing). Referring now to FIG. 26, a sectional view is shown of a lower housing 108 in accordance with various embodiments herein. The lower housing 108 can define stabilization surfaces 2602 extending outward from a central portion of a lower surface of the lower housing 108. The stabilization surfaces can interface with a surface of the filtration system to support the filter restriction indicator when it is mounted on a filtration system (such as an air cleaner). The stabilization surfaces can be substantially flush with a lower surface of the lower housing 108. In some embodiments, the stabilization surfaces can extend outward from the center of the lower surface of the lower housing 108 by at least about 0.5, 1, 2, 3, 4, 5, 6, 7 or 8 centimeters, or an amount falling within a range between any of the foregoing.

Methods

Many different methods are contemplated herein, including, but not limited to, methods of making, methods of using, and the like. Aspects of system/device operation described elsewhere herein can be performed as operations of one or more methods in accordance with various embodiments herein.

In an embodiment, a method of making a filter restriction indicator for a filtration system is included. The method can include assembling an electronics control cartridge including operations of inserting a first circuit board into a bottom portion of an internal spacer frame and inserting a second circuit board into a top portion of an internal spacer frame. The method can further include placing the electronics control cartridge over a lower housing and placing a cap over the electronics control cartridge and fastening the cap to the lower housing.

In an embodiment of a method, inserting a first circuit board into a bottom portion of an internal spacer frame can include snapping the first circuit board upward into a lower snap fit channel, the lower snap fit channel defined by opposed jaws.

In an embodiment of a method, inserting a second circuit board into a top portion of an internal spacer frame can include snapping the second circuit board downward into an upper snap fit channel, the upper snap fit channel defined by opposed jaws.

In an embodiment of a method, the first circuit board and second circuit board are connected by an electrically conductive cable and the internal spacer frame includes a lateral perimeter strut, and the electrically conductive cable passes over an outside surface of the lateral perimeter strut.

In an embodiment of a method, the electronics control cartridge further includes a filter fluid tube and the lower housing defines a central recess configured to receive the filter fluid tube when the electronics control cartridge is placed over a lower housing.

In some embodiments, a method of using a filter restriction indicator for a filtration system is included herein. The method can include mounting the filter restriction indicator over a restriction indicator port on the filtration system. The method can also include measuring a pressure differential between an ambient pressure and a pressure associated with a portion of the filtration system in fluid communication with the restriction indicator port. The method can also include sending a wireless signal with the filter restriction indicator directly or indirectly reflecting the measured pressure differential. The filter restriction indicator used in the method can be in accord with any of the embodiments described herein.

Battery

In various embodiments, the filter restriction indicators herein include a battery. It will be appreciated that various battery chemistries are contemplated herein. Batteries herein can include both primary and second batteries. Exemplary primary battery chemistries can include, but are not limited to, zinc-carbon, zinc chloride, zinc-manganese dioxide, oxy nickel hydroxide, lithium, lithium-copper oxide, lithium-iron disulfide, lithium-manganese dioxide, mercury oxide, zinc-air, silver oxide, and the like. Exemplary secondary battery chemistries can include, but are not limited to, nickel-cadmium (NiCad), lead acid, nickel-metal hydride (NiMH), lithium ion, and the like.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A filter restriction indicator for a filtration system comprising:
   an electronics control cartridge comprising
      an internal spacer frame;
      a first circuit board;
      a second circuit board disposed over the first circuit board; and
      a pressure sensor in electrical communication with the first circuit board;
      a filter fluid tube disposed below the first circuit board, the filter fluid tube defining a filter fluid channel, wherein the filter fluid channel is in fluid communication with the pressure sensor;
      wherein the internal spacer frame is configured to secure the first circuit board at a fixed distance from the second circuit board with a gap disposed between the first and second circuit boards;
   a lower housing defining an ambient pressure port;
   a cap defining an interior volume, wherein the electronics control cartridge is configured to fit within the interior volume of the cap;
   the cap configured to engage the lower housing;
   the cap defining a shielding panel configured to fit over an exterior portion of the ambient pressure port when the cap is engaged with the lower housing.

2. The filter restriction indicator of claim 1, further comprising a breather filter disposed over an exterior portion of the ambient pressure port.

3. The filter restriction indicator of claim 1, wherein the internal spacer frame comprises a lateral perimeter strut, wherein an electrically conductive cable passes over an outside surface of the lateral perimeter strut, the electrically conductive cable providing electrical communication between components of the first circuit board and components of the second circuit board.

4. The filter restriction indicator of claim 1, the internal spacer frame comprising an upper snap fit channel to receive the second circuit board and a lower snap fit channel to receive the first circuit board.

5. The filter restriction indicator of claim 4, the upper and lower snap fit channels formed by opposed offset jaws.

6. The filter restriction indicator of claim 4, wherein the upper snap fit channel is oriented for insertion of the second circuit board from the top of the upper snap fit channel and the lower snap fit channel is oriented for insertion of the first circuit board from the bottom of the lower snap fit channel.

7. The filter restriction indicator of claim 1, the cap comprising a lower perimeter rim, the lower rim defining a flexural relief indent.

8. The filter restriction indicator of claim 1, the cap comprising a lower perimeter rim divided into an outer perimeter rim and an inner perimeter rim, the lower perimeter rim defining an annular relief channel disposed between the outer perimeter rim and the inner perimeter rim.

9. The filter restriction indicator of claim 8, the lower housing defining an outer circumferential rim, wherein the circumferential rim fits into the annular relief channel of the cap when the cap engages the lower housing.

10. The filter restriction indicator of claim 8, the lower housing further defining an inner circumferential rim, the inner circumferential rim separated from the outer circumferential rim by an annular seal channel.

11. The filter restriction indicator of claim 10, further comprising a compression gasket disposed within the annular seal channel, wherein the compression gasket is compressed when the cap engages the lower housing.

12. The filter restriction indicator of claim 1, the internal spacer frame comprising a plurality of spacing ridges on an outside perimeter surface thereof, the spacing ridges configured to interface with an inside surface of the cap when the electronics control cartridge is positioned within the interior volume of the cap.

13. The filter restriction indicator of claim 1, the pressure sensor comprising a first surface in fluid communication with the filter fluid channel and a second surface in fluid communication with the ambient pressure port.

14. The filter restriction indicator of claim 1, wherein the lower housing further defines a central recess configured to receive the filter fluid tube.

15. The filter restriction indicator of claim 14, further comprising a deformable seal disposed around a lower portion of the filter fluid tube, wherein the deformable seal provides a seal between an outer diameter of the filter fluid tube and an inner diameter of the central recess of the lower housing.

16. The filter restriction indicator of claim 15, the deformable seal comprising a plurality of annular ridges disposed on an outside surface thereof.

17. The filter restriction indicator of claim 1, wherein the internal spacer frame is configured to engage with the first circuit board and the second circuit board.

18. The filter restriction indicator of claim 1, wherein the shielding panel is configured to cover the exterior portion of the ambient pressure port when the cap is engaged with the lower housing.

* * * * *